(12) United States Patent
Fukuda et al.

(10) Patent No.: US 9,990,543 B2
(45) Date of Patent: Jun. 5, 2018

(54) VEHICLE EXTERIOR MOVING OBJECT DETECTION SYSTEM

(71) Applicant: HITACHI CONSTRUCTION MACHINERY CO., LTD., Tokyo (JP)

(72) Inventors: Yoshibumi Fukuda, Tokyo (JP); Chieko Onuma, Tokyo (JP); Moritaka Oota, Tsuchiura (JP); Yukihiro Kawamata, Tsuchiura (JP); Yoichi Kowatari, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days. days.

(21) Appl. No.: 15/511,301

(22) PCT Filed: Sep. 7, 2015

(86) PCT No.: PCT/JP2015/075361
§ 371 (c)(1),
(2) Date: Mar. 15, 2017

(87) PCT Pub. No.: WO2016/125332
PCT Pub. Date: Aug. 11, 2016

(65) Prior Publication Data
US 2017/0286763 A1 Oct. 5, 2017

(30) Foreign Application Priority Data

Feb. 4, 2015 (JP) .................... 2015-019925

(51) Int. Cl.
*G08B 23/00* (2006.01)
*G06K 9/00* (2006.01)
(Continued)

(52) U.S. Cl.
CPC .......... *G06K 9/00369* (2013.01); *B60R 11/04* (2013.01); *G06K 9/00805* (2013.01);
(Continued)

(58) Field of Classification Search
CPC .......... G06K 9/00369; G06K 9/00664; G06K 9/00791; G06K 9/3241; G06K 9/00805;
(Continued)

(56) References Cited

U.S. PATENT DOCUMENTS 9,840,197 B2 * 12/2017 Baek ..................... B60R 1/00
2013/0114860 A1 5/2013 Isaku et al.
(Continued)

FOREIGN PATENT DOCUMENTS

JP 2008-248613 A 10/2008
JP 2010-217979 A 9/2010
(Continued)

OTHER PUBLICATIONS

International Preliminary Report on Patentability received in corresponding International Application No. PCT/JP2015/075361 dated Aug. 17, 2017.
(Continued)

*Primary Examiner* — Toan N Pham
(74) *Attorney, Agent, or Firm* — Mattingly & Malur, PC

(57) ABSTRACT

The vehicle exterior moving object detection system includes a surrounding-area image input section for capturing images in areas surrounding its own vehicle and delivering the captured images as surrounding-area images, a combined image constructing section for constructing a combined image including a result output from the detection of a moving object by combining the surrounding-area images, and an output section for presenting the combined image to the user. The vehicle exterior moving object detection system includes a movable-component region setting section for setting shapes and layout of movable components of the own vehicle in the surrounding-area images and calculating regions for the movable components of the vehicle, and a moving object detecting section for being
(Continued)

supplied with the movable-component regions calculated by the movable-component region setting section and the surrounding-area images from the surrounding-area image input section, performing a process of detecting a moving object, and outputting a detection result.

5 Claims, 19 Drawing Sheets

(51) Int. Cl.
| | |
|---|---|
| *G06K 9/46* | (2006.01) |
| *B60R 11/04* | (2006.01) |
| *G08G 1/16* | (2006.01) |
| *B60Q 9/00* | (2006.01) |
| *G08B 21/22* | (2006.01) |
| *H04N 5/247* | (2006.01) |

(52) U.S. Cl.
CPC ............... *G06K 9/46* (2013.01); *G08G 1/166* (2013.01); *B60Q 9/008* (2013.01); *B60W 2420/42* (2013.01); *G06K 2209/23* (2013.01); *G06T 2207/30261* (2013.01); *G08B 21/22* (2013.01); *H04N 5/247* (2013.01)

(58) Field of Classification Search
CPC .. B60Q 9/008; B60Q 9/143; B60R 2300/303; B60R 2300/8093
USPC ............ 340/573.1, 435, 436, 937; 701/301; 382/291

See application file for complete search history.

(56) References Cited

U.S. PATENT DOCUMENTS

| | | | |
|---|---|---|---|
| 2015/0022664 A1* | 1/2015 | Pflug .................. | H04N 7/181 348/148 |
| 2017/0132480 A1* | 5/2017 | Han .................... | G06T 3/0062 |
| 2017/0320437 A1* | 11/2017 | Liebau ................ | B60R 1/002 |

FOREIGN PATENT DOCUMENTS

| | | |
|---|---|---|
| JP | 2012-160972 A | 8/2012 |
| WO | 2012/066589 A1 | 5/2012 |
| WO | 2014/073571 A1 | 5/2014 |

OTHER PUBLICATIONS

International Search Report of PCT/JP2015/075361 dated Nov. 10, 2015.

* cited by examiner

FIG. 12

```
DEF own_vehicle Group {
  DEF left_front_wheel Solid {
    Attribute movable_component
    Shape {
      (..., ..., ...)
    }
    Pivot {
      (..., ..., ...)
    }
    Range {
      Angle (..., ..., ...)
    }
  }
  DEF front_vamera Camera {
    Position (..., ..., ...)
    Direction (..., ..., ...)
    FOV ...
  }
  ⋮
}
```

} DESCRIPTION ABOUT LEFT FRONT WHEEL

} DESCRIPTION ABOUT FRONT CAMERA

} DESCRIPTION ABOUT OWN VEHICLE

VEHICLE EXTERIOR MOVING OBJECT DETECTION SYSTEM

TECHNICAL FIELD

The present invention relates to a vehicle exterior moving object detection system.

BACKGROUND ART

There is an image processing apparatus for detecting an object in the area surrounding a vehicle using a plurality of images captured in different directions by a plurality of cameras provided on the vehicle in order to increase the accuracy with which objects in the area surrounding the vehicle are detected. The image processing apparatus includes behavior estimating means for estimating behavior parameters that indicate the behavior of the vehicle with respect to the respective images, setting means for setting behavior parameters to be used for detecting an object in the area surrounding the vehicle on the basis of the plurality of behavior parameters estimated respectively with respect to the plurality of images, and object detecting means for detecting an object in the area surrounding the vehicle using the behavior parameters set by the setting means and the plurality of images (see, for example, Patent Document 1).

PRIOR ART DOCUMENT

Patent Document

Patent Document 1: JP-2010-217979-A

SUMMARY OF THE INVENTION

Problems to be Solved by the Invention

The image processing apparatus referred to above includes a direction-of-travel detecting section for determining the direction of travel of the vehicle from gears and a steering angle of the vehicle, a setting section for selecting an appropriate monitoring section from monitoring sections provided for the plurality of cameras mounted on the vehicle on the basis of detection result of the direction-of-travel detecting section, behavior estimating sections in the monitoring sections for estimating the behavior of the own vehicle on the basis of the images acquired by the cameras, road surface estimating sections in the monitoring sections for estimating a road surface, and obstacle detecting sections in the monitoring sections for detecting an obstacle. The setting section acquires estimated information from a monitoring section that has been indicated, and sends the acquired estimated information to the monitoring sections. The obstacle detecting sections in the monitoring sections detect an obstacle on the basis of the estimated information received from the setting section and the images supplied from the cameras. As a result, it is possible to increase the accuracy with which an object in the area surrounding the vehicle is detected.

Large-size construction machines such as dump trucks for use in mines are provided with structural components of their own vehicle, such as a vehicle body, tires, etc. which are larger in size than those of general vehicles, and their vehicle body is complex in structure. Therefore, the images may include therein road surfaces and operational structural components of their own vehicle (e.g., a vessel, tires, etc.) in an intricate pattern, depending on the shape of the vehicle body, the positions where the cameras are installed, regions imaged by the cameras, etc.

While its own vehicle is in motion, the movement of the tires in the images and the apparent motion of the road surface in the images are different from each other in terms of the directions in which and the distances by which they move in the images. Since the tires are mounted on shafts on its own vehicle, they exist generally in the same positions in the images, though their surfaces turn. When the own vehicle turns to the right or left, the tires are tilted to the right or left. On the other hand, the road surface appears to move in the images as the own vehicle moves. When the own vehicle moves forwards, the road surfaces in the image captured by the camera mounted on a left side of the own vehicle moves from the right to the left.

The above image processing apparatus incorporates a moving stereo system that compares an image in a previous frame and a present image with each other to detect the three-dimensional position of an object, and estimates a road surface from the measurement results. The image processing apparatus detects an object that occupies a certain position in an image as an obstacle in the coordinate system of the estimated road surface. If the image processing apparatus is incorporated in the above-described construction machine, then since a tire is calculated as existing in a position different from the road surface, the tire is likely to be erroneously detected as an obstacle and notified as such to the operator.

The present invention has been made in view of the above matters. It is an object of the present invention to provide a vehicle exterior moving object detection system for detecting a moving object in a region of a surrounding-area image, which region is exclusive of movable regions of movable structural components of the own vehicle.

Means for Solving the Problems

In order to address the above problem, the present invention employs the arrangements described in the scope of claims for patent, for example. The invention of the present application includes a plurality of means for solving the above problem. As an example, the present invention is concerned with a vehicle exterior moving object detection system including a surrounding-area image input section for capturing images in areas surrounding its own vehicle and delivering the captured images as surrounding-area images, a combined image constructing section for constructing a combined image including a result output from detection of a moving object by combining the surrounding-area images, and an output section for presenting the combined image to the user, wherein the vehicle exterior moving object detection system further includes a movable-component region setting section for setting shapes and layout of movable components of the own vehicle in the surrounding-area images and calculating regions for the movable components of the own vehicle, and a moving object detecting section for being supplied with the movable-component regions calculated by the movable-component region setting section and the surrounding-area images from the surrounding-area image input section, performing a process of detecting a moving object on a region in the surrounding-area images which is exclusive of the movable-component regions, and outputting a detection result.

Effect of the Invention

According to the present invention, the vehicle exterior moving object detection system detects a moving object in a region of a surrounding-area image, which region is exclusive of movable regions of movable structural components of the own vehicle. Therefore, the vehicle exterior moving object detection system is prevented from detecting a movable structural component of the own vehicle in error, and is also prevented from overlooking a detection target in the vicinity of the own vehicle to which the user should pay utmost attention in operating the own vehicle. The user can thus acquire only the result of the detection of a moving object that is required for a working process. As a result, the efficiency with which the overall working process is performed is increased.

BRIEF DESCRIPTION OF THE DRAWINGS

FIG. 12 is a diagram illustrating an example of character data held by an own vehicle shape attribute holding section according to the first embodiment of the vehicle exterior moving object detection system of the present invention.

MODE FOR CARRYING OUT THE INVENTION

Embodiments of the present invention will be described below with reference to the drawings by taking the case in which the embodiments are applied to a dump truck as a large-size transportation vehicle for transporting crushed stone, minerals, etc. dug up from mines or the like as an example. The application of the present invention is not limited to dump trucks.

Embodiment 1

Figure 1:
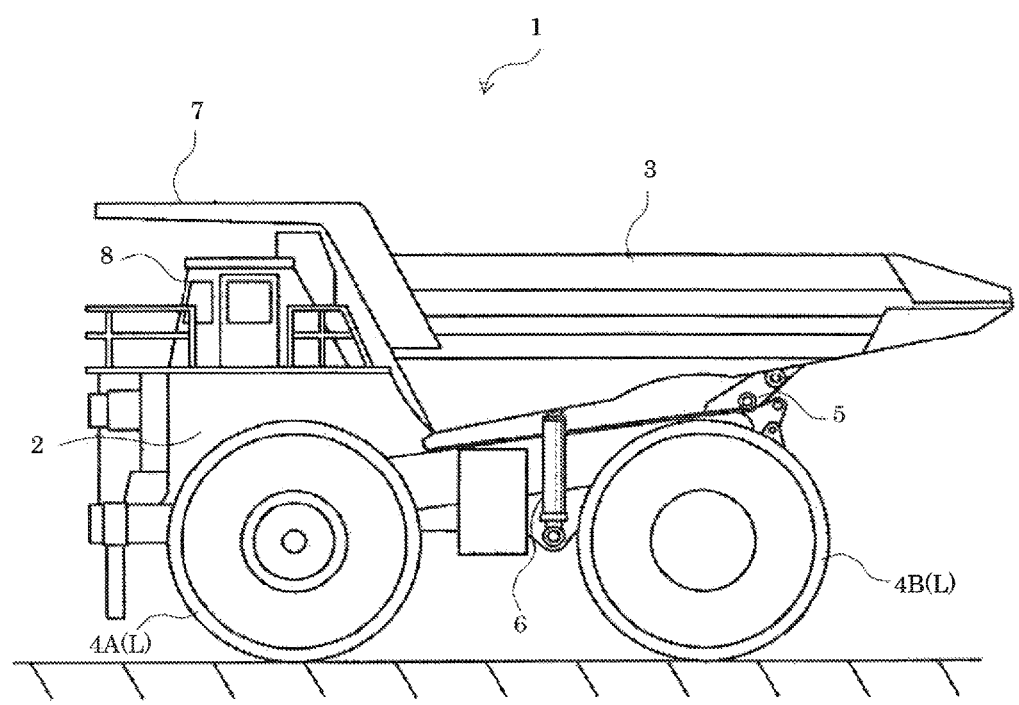
FIG. 1 is a side elevational view illustrating a dump truck including a first embodiment of a vehicle exterior moving object detection system of the present invention.

FIG. 1 is a side elevational view illustrating a dump truck including a first embodiment of a vehicle exterior moving object detection system of the present invention.

A dump truck (own vehicle) 1 illustrated in FIG. 1 mainly includes a vehicle body 2 formed as a rugged frame structure, a vessel (cargo bed) 3 mounted on the vehicle body 2 in a way that can be raised and lowered, and a left front wheel 4A(L) and a left rear wheel 4B(L) mounted on the vehicle body 2.

An engine (not illustrated) for driving the rear wheel 4B is disposed on the vehicle body 2. The engine includes, for example, an engine control device (hereinafter referred to as "ECU"), and has its revolution speed controlled by controlling the flow rate of the supplied fuel with a command signal from the ECU.

The vessel 3 is a container for carrying cargo such as crushed stone or the like, and is coupled to the vehicle body 2 by a pin joint unit 5 or the like in a way that can be raised and lowed. On the lower part of the vessel 3, there are installed two raising and lowering cylinders 6 which are spaced a given distance from each other in the widthwise directions of the vehicle. When hydraulic fluid is supplied to or discharged from the raising and lowering cylinders 6, the raising and lowering cylinders 6 are extended or contracted to raise or lower the vessel 3. A canopy 7 is provided on a front upper portion of the vessel 3.

The canopy 7 has a function to protect an operator cab 8 disposed therebelow (i.e., in a front portion of the vehicle body 2) against flying objects such as stone or the like and also to protect the operator cab 8 at the time the vehicle falls over. The operator cab 8 houses therein a vehicle exterior moving object detection system 100 (see FIG. 4) of a control apparatus of the vehicle exterior moving object detection system, a steering wheel (not illustrated), and an accelerator pedal, a brake pedal, etc. (not illustrated).

Figure 2:
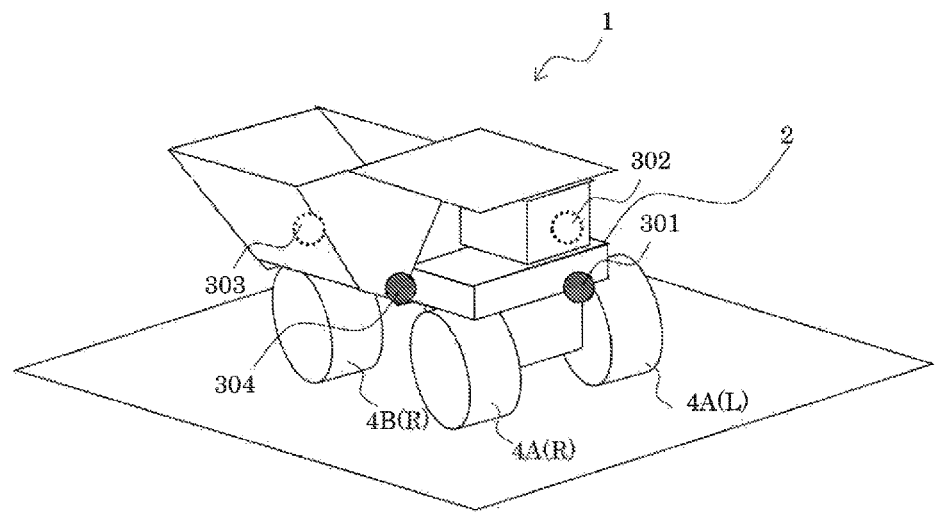
FIG. 2 is a conceptual view illustrating the layout of cameras configuring a surrounding-area image input section according to the first embodiment of the vehicle exterior moving object detection system of the present invention.
Figure 3:
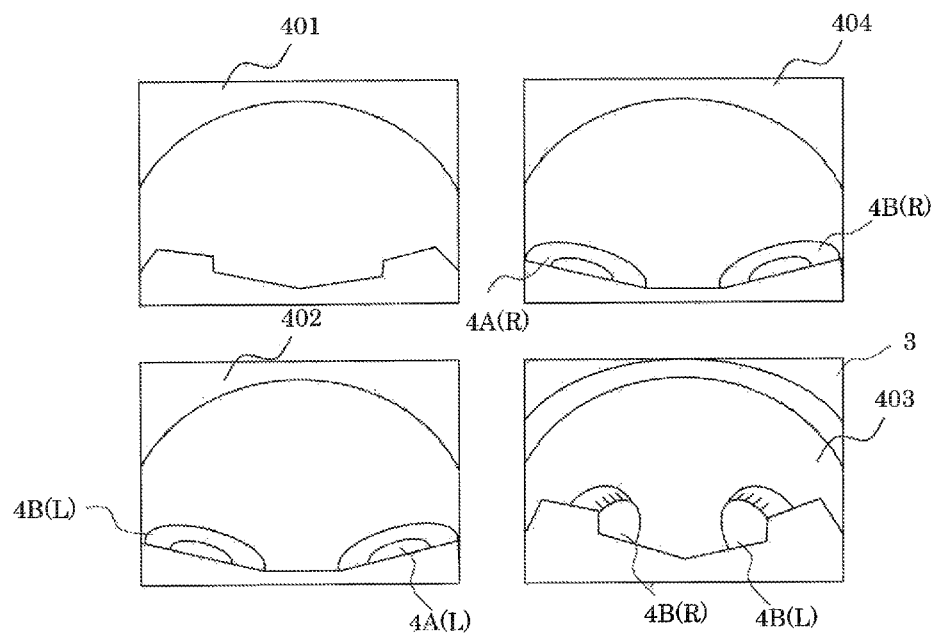
FIG. 3 is a conceptual view illustrating images captured by the cameras configuring the first embodiment of the vehicle exterior moving object detection system of the present invention.

FIG. 2 is a conceptual view illustrating the layout of cameras configuring a surrounding-area image input section according to the first embodiment of the vehicle exterior moving object detection system of the present invention, and FIG. 3 is a conceptual view illustrating images captured by the cameras configuring the first embodiment of the vehicle exterior moving object detection system of the present invention.

In FIG. 2, a front camera 301 for capturing an area forward of the dump truck 1 in a wide angle and a rear camera 303 for capturing an area rearward of the dump truck 1 in a wide angle are mounted respectively on front and rear side surfaces of the vehicle body 2 of the dump truck 1. A leftward camera 302 for capturing an area leftward of the dump truck 1 in a wide angle and a rightward camera 304 for capturing an area rightward of the dump truck 1 in a wide angle are mounted respectively on left and right side surfaces of the vehicle body 2. These cameras 301 through 304 are attached at an angle of depression to the respective surfaces of the vehicle body 2 so that they can primarily capture respective ground surfaces. A right front wheel 4A(R), a right rear wheel 4B(R), the left front wheel 4A(L), and the left rear wheel 4B(L) are mounted on the vehicle body 2 of the dump truck 1.

FIG. 3 illustrates examples of images in the surrounding area which are captured by these cameras 301 through 303.

401 represents an example of a front image captured by the front camera 301, 402 an example of a leftward image captured by the leftward camera 302, 403 an example of a rear image captured by the rear camera 303, and 404 an example of a rightward image captured by the rightward camera 304.

Since each of the surrounding-area images 401 through 404 is captured in a wide angle, the horizon included in the far side, i.e., in an upper portion of each image, is viewed as curved. Part of the vehicle body 2 is included in the near side, i.e., a lower portion of each image. For example, the front image 401 includes part of a front portion of the vehicle body 2, and the leftward image 402 includes a left side portion of the vehicle body 2 and the left front wheel 4A(L) and the left rear wheel 4B(L). The rightward image 404 includes a right side portion of the vehicle body 2 and the right front wheel 4A(R) and the right rear wheel 4B(R), and the rear image 403 includes a rear portion of the vehicle body 2, the left rear wheel 4B(L), the right rear wheel 4B(R), and part of the vessel 3 of own vehicle 1 in an upper portion of the image.

As the cameras use wide-angle lenses in this example, distortions are large especially in marginal portions of the images such as a region where the vessel 3 is included. Furthermore, one wheel may be imaged by a plurality of cameras. The front image 401, the leftward image 402, the rear image 403, and the rightward image 404 put together are referred to as surrounding-area images according to the present embodiment.

Figure 4:
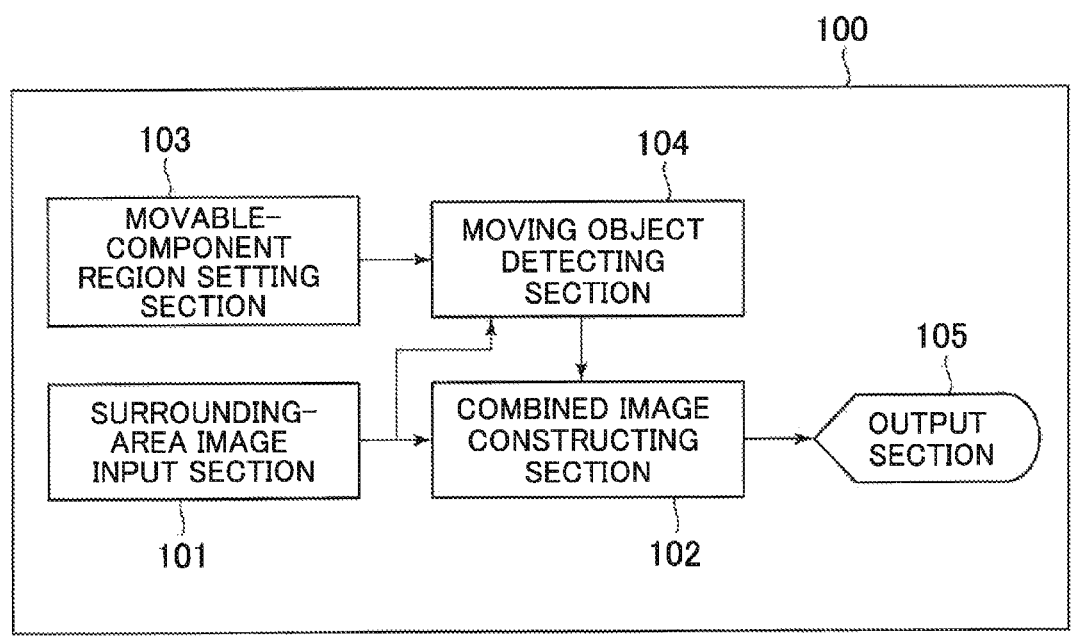
FIG. 4 is a block diagram illustrating a configuration of the first embodiment of the vehicle exterior moving object detection system of the present invention.

FIG. 4 is a block diagram illustrating a configuration of the first embodiment of the vehicle exterior moving object detection system of the present invention. In FIG. 4, the vehicle exterior moving object detection system according to the first embodiment includes a vehicle exterior moving object detection system 100.

The vehicle exterior moving object detection system 100 has a surrounding-area image input section 101, a combined image constructing section 102, a movable region setting section 103, a moving object detecting section 104, and an output section 105.

The surrounding-area image input section 101 has the cameras 301 through 304 for capturing respective states in the area surrounding the dump truck 1. The surrounding-area image input section 101 sends the surrounding-area images 401 through 404 representing captured results to the combined image constructing section 102 and the moving object detecting section 104.

The combined image constructing section 102 is supplied with the plurality of surrounding-area images 401 through 404 sent from the surrounding-area image input section 101 and a detected-position coordinate signal representing the position of a moving object from the moving object detecting section 104. The combined image constructing section 102 segments necessary portions from the surrounding-area images supplied in order to generate a combined image, transforms the coordinates of the segmented portions, combines the segmented portions, combines an image extracting the detection result of the detected position of a moving object on the basis of the supplied detected-position coordinates, and delivers an obtained combined image to the output section 105.

The movable region setting section 103 holds information of the positional relationship of movable components of the own vehicle 1. If the movable components are included in the images captured by the cameras of the surrounding-area image input section 101, then the movable-component region setting section 103 delivers regions corresponding to the movable components. Otherwise, the movable-component region setting section 103 delivers information indicating that there are no regions of movable components. Specifically, the movable-component region setting section 103 holds shape information and attribute information of components that make up the own vehicle 1, information of the movable components, and attribute information of the cameras. If the movable components are included in the captured images, then the movable-component region setting section 103 calculates the regions from the information, and outputs the calculated regions to the moving object detecting section 104. A movable-component region refers to, when a moving part is captured by the camera among the structural components of own vehicle 1, a region occupied by the moving part.

The moving object detecting section 104 performs a process of detecting a moving object on a region exclusive of the movable-component region delivered by the movable-component region setting section 103, with respect to the surrounding-area images 401 through 404 delivered by the surrounding-area image input section 101, thereby to detect whether there is a moving object in the image or not. If the moving object detecting section 104 detects a moving object, then the moving object detecting section 104 delivers detected-position coordinates representing the position where the moving object is detected, together with the surrounding-area image, to the combined image constructing section 102.

The output section 105 includes a display, etc. and outputs the combined image supplied from the combined image constructing section 102 to the user.

Figure 5:
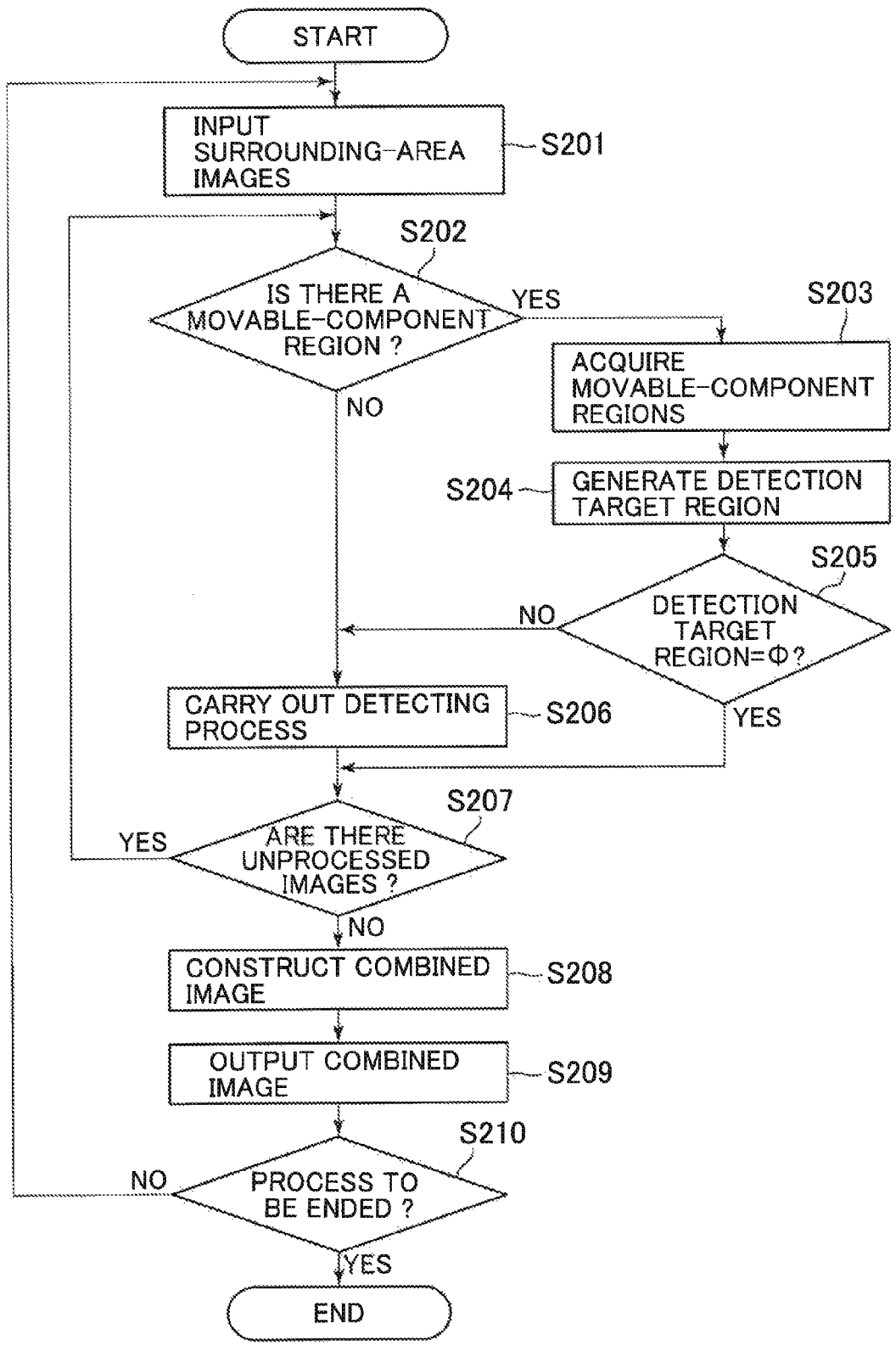
FIG. 5 is a flowchart diagram illustrating processing details according to the first embodiment of the vehicle exterior moving object detection system of the present invention.
Figure 6:
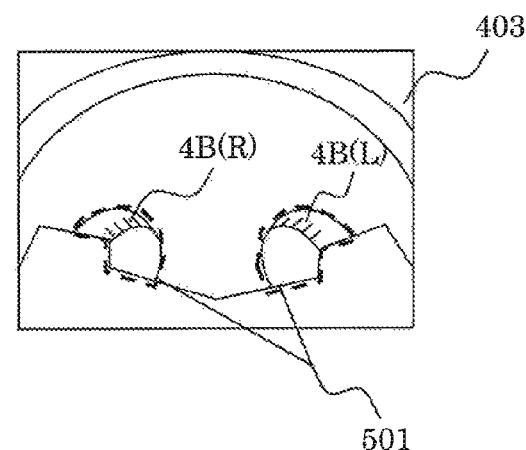
FIG. 6 is a conceptual view illustrating an example of the setting of movable-component regions according to the first embodiment of the vehicle exterior moving object detection system of the present invention.
Figure 7:
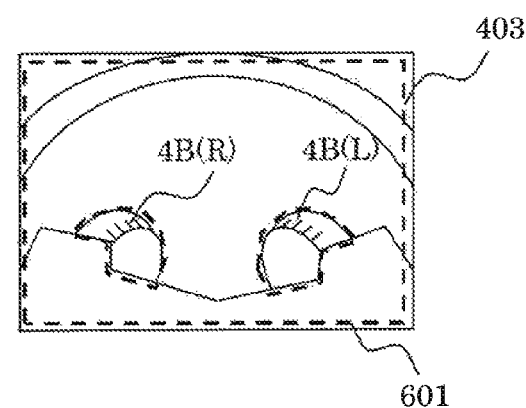
FIG. 7 is a conceptual view illustrating an example of the setting of a detection target region according to the first embodiment of the vehicle exterior moving object detection system of the present invention.
Figure 8A:
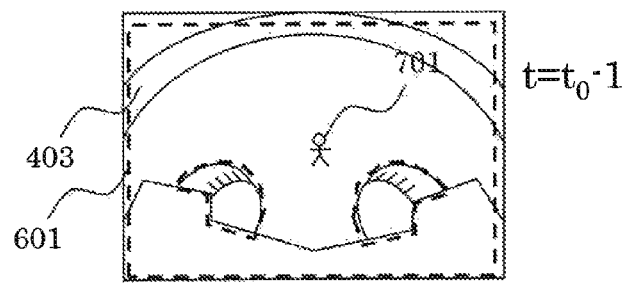
FIG. 8A is a conceptual view illustrating an image at a certain time, the image being an example of the detection of a moving object according to the first embodiment of the vehicle exterior moving object detection system of the present invention.
Figure 8B:
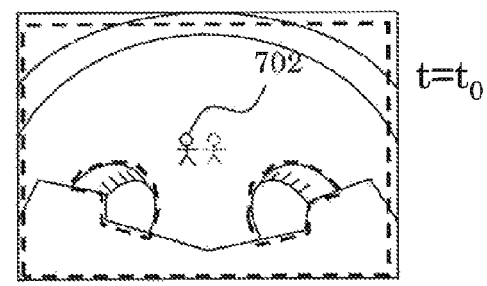
FIG. 8B is a conceptual view illustrating an image at another time subsequent to the certain time, the image being an example of the detection of a moving object according to the first embodiment of the vehicle exterior moving object detection system of the present invention.
Figure 8C:
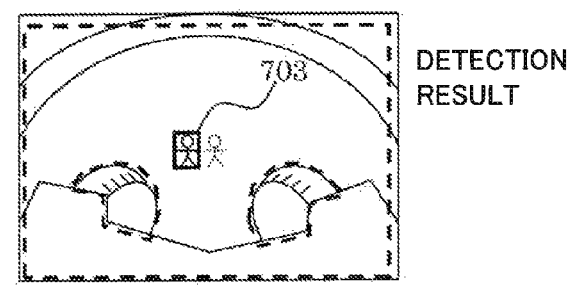
FIG. 8C is a conceptual view illustrating an image of a detection result, the image being an example of the detection of a moving object according to the first embodiment of the vehicle exterior moving object detection system of the present invention.
Figure 9:
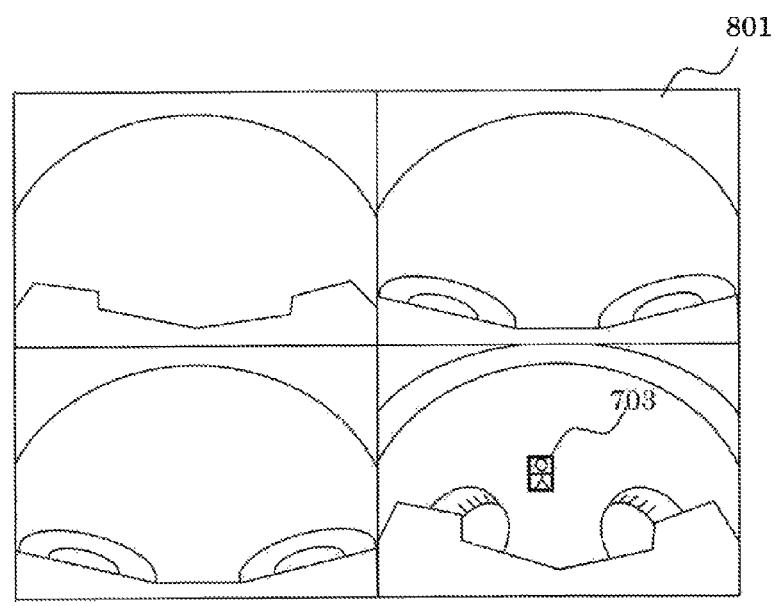
FIG. 9 is a conceptual view illustrating an example of displaying the detection result of a moving object according to the first embodiment of the vehicle exterior moving object detection system of the present invention.
Figure 10:
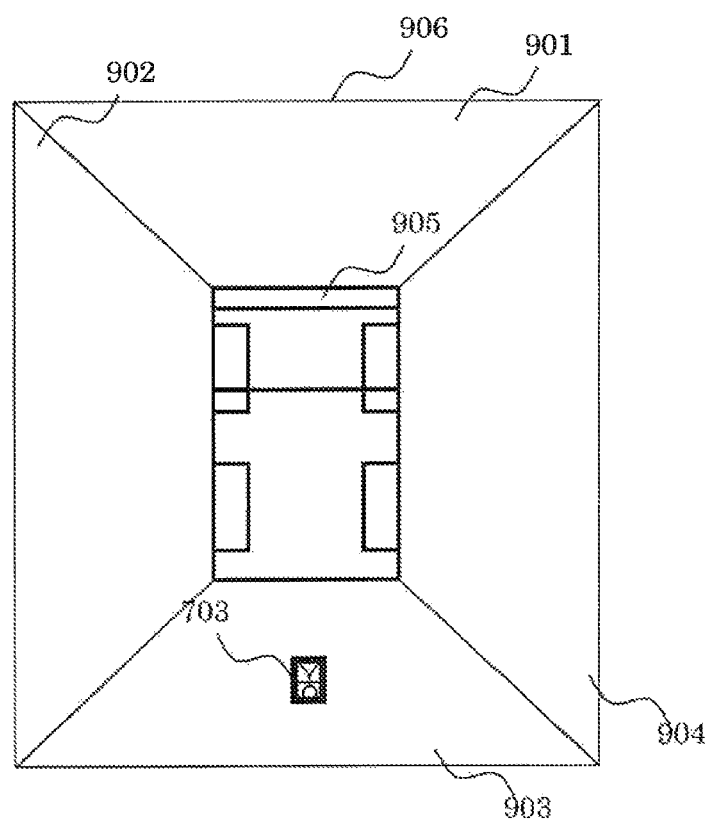
FIG. 10 is a conceptual view illustrating another example of displaying the detection result of the detection of a moving object according to the first embodiment of the vehicle exterior moving object detection system of the present invention.

The detection of a moving object and processing details for display according to the first embodiment of the vehicle exterior moving object detection system of the present invention will be described below with reference to FIGS. 5 through 9. FIG. 5 is a flowchart diagram illustrating processing details according to the first embodiment of the vehicle exterior moving object detection system of the present invention. FIG. 6 is a conceptual view illustrating an example of the setting of movable-component regions according to the first embodiment of the vehicle exterior moving object detection system of the present invention. FIG. 7 is a conceptual view illustrating an example of the setting of a detection target region according to the first embodiment of the vehicle exterior moving object detection system of the present invention. FIG. 8A is a conceptual view illustrating an image at a certain time, the image being an example of the detection of a moving object according to the first embodiment of the vehicle exterior moving object detection system of the present invention. FIG. 8B is a conceptual view illustrating an image at another time subsequent to the certain time, the image being an example of the detection of a moving object according to the first embodiment of the vehicle exterior moving object detection system of the present invention. FIG. 8C is a conceptual view illustrating an image of a detection result, the image being an example of the detection of a moving object according to the first embodiment of the vehicle exterior moving object detection system of the present invention. FIG. 9 is a conceptual view illustrating an example of displaying the detection result of the detection of a moving object according to the first embodiment of the vehicle exterior moving object detection system of the present invention. FIG. 10 is a conceptual view illustrating another example of displaying the detection result of the detection of a moving object according to the first embodiment of the vehicle exterior moving object detection system of the present invention. Those parts illustrated in FIGS. 5 through 10 which are denoted by reference symbols that are identical to those illustrated in FIGS. 1 through 4 are identical to the corresponding parts, and their detailed description will be omitted.

In FIG. 5, the vehicle exterior moving object detection system 100 is supplied with surrounding-area images (step S201). Specifically, the vehicle exterior moving object detection system 100 is supplied with the surrounding-area images 401 through 404 captured by the surrounding-area image input section 101.

The vehicle exterior moving object detection system 100 judges whether a movable-component region is set in the movable-component region setting section 103 or not (step S202). The movable-component region refers to, when a moving part is captured by the camera among the structural components of own vehicle 1, a region occupied by the moving part.

An example of the setting of a movable-component region will be described below with reference to FIG. 6. FIG. 6 illustrates an example of the setting of a movable region in the rear image 403. In the image, the left rear wheel 4B(L) and the right rear wheel 4B(R) are movable components that rotate along a vehicle axis at the time own vehicle 1 moves. For example, grooves in a tire move in the image. Regions that enclose the movable components in the image are set as movable-component regions 501 for the rear wheels 4B.

Referring back to FIG. 5, if the vehicle exterior moving object detection system 100 judges such movable-component regions are set, then control goes to (step S203). Otherwise, control goes to (step S206).

The vehicle exterior moving object detection system 100 acquires the movable-component regions (step S203). Specifically, the movable region setting section 103 acquires information of the shapes and layout of the movable-component regions in the image. Here, the result that a rear portion of the own vehicle 1 and part of the rear wheels 4B as illustrated in FIG. 6 are included in a lower portion of the image is obtained by calculating which portion of the own vehicle 1 is imaged by the rear camera 303 from the attribute information of the camera, which represents the position and direction in which the rear camera 303 is installed, and is held by the movable region setting section 103. Further, the region in which the rear wheels 4B are included in the image is acquired as the movable-component regions 501 by using the information that the rear wheels 4B are movable components. Further details will be described later.

The vehicle exterior moving object detection system 100 generates a detection target region (step S204). Specifically, the vehicle exterior moving object detection system 100 generates a region (detection target region) for detecting whether there is a moving object or not. Here, the vehicle exterior moving object detection system 100 generates an entire region in the rear image 403 illustrated in FIG. 7, which is exclusive of the movable-component regions 501 for the rear wheels 4B, as a detection target, and sets this region as a rear detection target region 601.

The vehicle exterior moving object detection system 100 judges whether the detection target region is an empty set Φ or not (step S205). Specifically, when the vehicle exterior moving object detection system 100 generates a detection target region in (step S204), if the movable-component regions of the own vehicle 1 exist in the entire image, for example, then the detection target region is judged as an empty set Φ. In the example illustrated in FIG. 7, since the movable-component regions 501 exist in only part of the rear image 403, but not in the entire rear image 403, the detection target region is not judged as an empty set Φ. If the vehicle exterior moving object detection system 100 judges that the detection target region is an empty set Φ, then control goes to (step S207). Otherwise, control goes to (step S206).

The moving object detecting section 104 of the vehicle exterior moving object detection system 100 carries out a moving object detecting process (step S206). The region in the image where the detecting process is to be carried out is the detection target region generated in step S204.

An example of the detecting process will be described below with reference to FIGS. 8A through 8C. FIGS. 8A through 8C illustrate the moving object detecting process in the rear image 403. From top to bottom, FIG. 8A illustrates an image at a certain time $t_0-1$, FIG. 8B illustrates an image at another time $t_0$ subsequent to the certain time $t_0-1$, and FIG. 8C illustrates an image of a detection result. In these images, the detecting process is carried out within the detection target region 601. Further, a person exists as a moving object in these images.

Here, FIG. 8A illustrates the state in which a moving object 701 at the certain time $t_0-1$ is captured in the rear image 403. FIG. 8B illustrates the state in which a moving object 702 at the other time $t_0$ subsequent to the certain time $t_0-1$ is captured in the rear image 403. These moving objects are the same entity, whose image is captured by the rear camera 304 as moving over time.

The moving object detecting section 104 illustrated in FIG. 4 compares these images supplied from the surrounding-area image input section 101, and calculates a location where the images have changed over time. A detection result 703, obtained by the calculation, in the detection target region 601 holds coordinate information in the rear image 403. If the images have not changed, then such a detection result is not obtained.

Referring back to FIG. 5, the vehicle exterior moving object detection system 100 judges whether there are unprocessed images or not (step S207). Specifically, the vehicle exterior moving object detection system 100 judges whether or not there remain images to which the detecting process is not applied in the surrounding-area images from the plurality of cameras. According to the present embodiment, for example, while the images to be processed are being switched over, the total of four detecting processes are performed on each frame of the images captured by the front camera 301, the leftward camera 302, the rear camera 303, and the rightward camera 304. If the vehicle exterior moving object detection system 100 judges there are unprocessed images, control goes to (step S202). Otherwise, control goes to (step S208).

The combined image constructing section 102 of the vehicle exterior moving object detection system 100 constructs a combined image (step S208). Specifically, the combined image constructing section 102 reduces the areas of the front image 401, the leftward image 402, the rear image 403, and the rightward image 404 by halving the vertical and horizontal lengths thereof and arranges these four types of images adjacent to each other in a tile-shaped pattern, thereby displaying the images in the four directions on one screen.

FIG. 9 illustrates an example of the display of such a result of the detection of a moving object. The example illustrates a tile-shaped combined image 801 constructed by the combined image constructing section 102. Using the coordinate values based on the calculation result from the moving object detecting section 104, the detection result 703 in the detection target region is plotted in a portion where the moving object is detected.

Referring back to FIG. 5, the vehicle exterior moving object detection system 100 outputs the combined image (step S209). Specifically, the tile-shaped combined image 801 constructed by the combined image constructing section 102 is output to the output section 105. The detection result 703 in the detection target region is displayed in this image.

The vehicle exterior moving object detection system 100 judges whether the detecting process is to be ended or not (step S210). If a working process is finished, for example, making the detection of an external moving object unnecessary, and a signal indicating the end of the processing sequence is input, then the processing sequence is ended. Otherwise, control goes back to the beginning of the processing sequence (step S201).

While the example in which the tile-shaped combined image 801 is output has been described above, the present invention is not limited to such an output. The combined image constructing section 102 may convert and combine the front image 401, the leftward image 402, the rear image 403, and the rightward image 404, construct an image illustrating the own vehicle 1 and its surrounding area in a bird's eye view, and output the constructed image to the output section 103. FIG. 10 illustrates another example of such display of the detection result of a moving object. There is produced a combined image 906 in a bird's eye view which includes a converted front image 901, a converted leftward image 902, a converted rear image 903, and a converted rightward image 904 that are positioned respectively in upward, leftward, downward, and rightward directions, and an own vehicle icon 905 which is positioned centrally. A detection result 703 within a detection target region is displayed in this image.

Based on the display of these results of the detection of a moving object, even if the left rear wheel 4B(L) and the right rear wheel 4B(R) are rotating, they are not detected as moving objects, and it is possible to detect a target such as the moving object 702 at the time $t_0$. As a consequence, the user can efficiently be aware of the existence of an object such as the moving object 702 at the time $t_0$ to which the user should pay attention.

Figure 11:
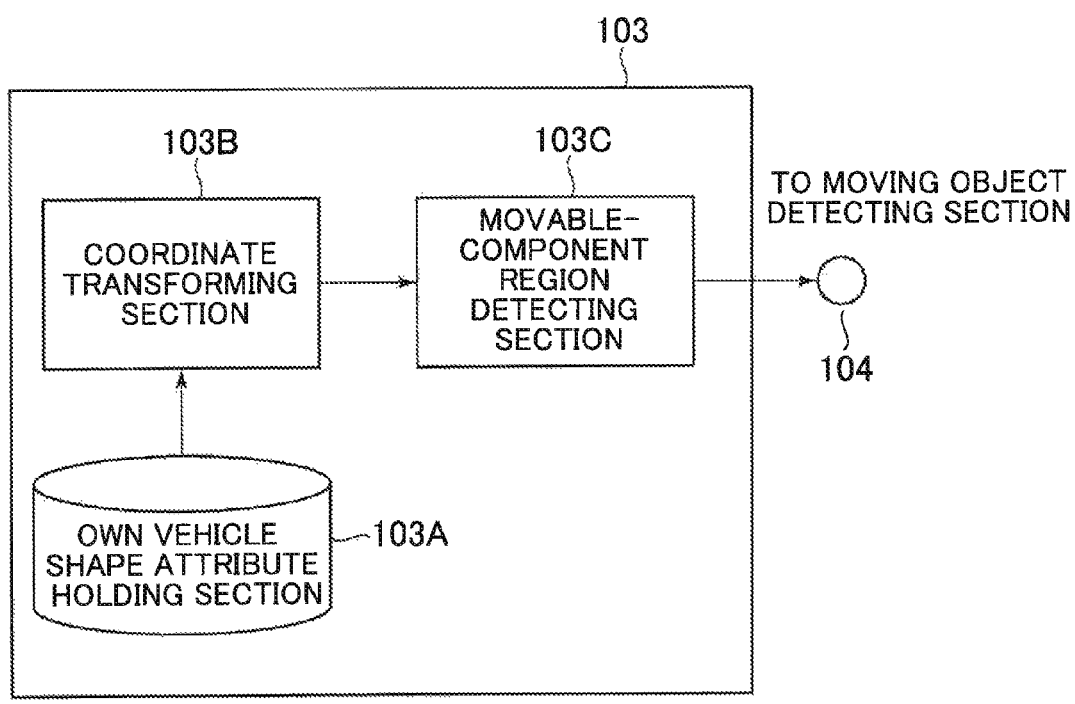
FIG. 11 is a block diagram illustrating a configuration of the movable-component region setting section according to the first embodiment of the vehicle exterior moving object detection system of the present invention.
Figure 13:
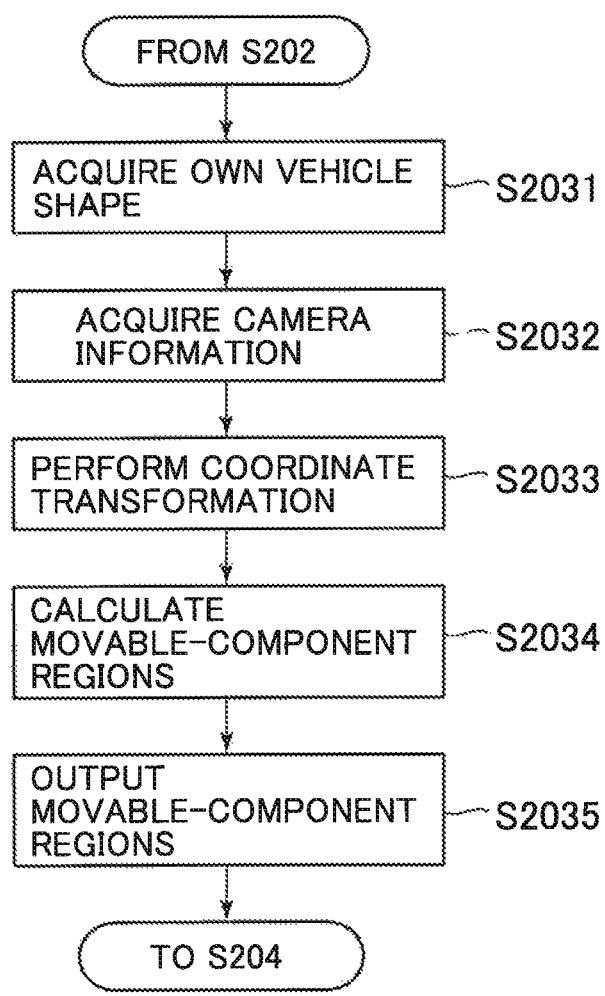
FIG. 13 is a flowchart diagram illustrating processing details of a movable-component region acquiring step according to the first embodiment of the vehicle exterior moving object detection system of the present invention.
Figure 14:
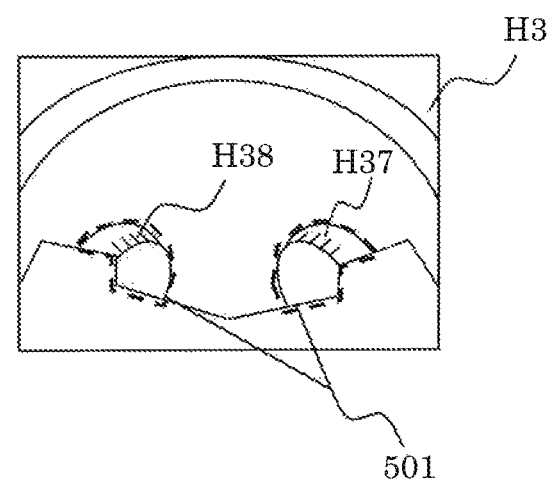
FIG. 14 is a conceptual view illustrating an example of the calculation of movable-component regions according to the first embodiment of the vehicle exterior moving object detection system of the present invention.

Detailed configuration and operation of the movable-component region setting section 103 configuring the vehicle exterior moving object detection system 100 will be described below with reference to FIGS. 11 through 14. FIG. 11 is a block diagram illustrating a configuration of the movable-component region setting section according to the first embodiment of the vehicle exterior moving object detection system of the present invention. FIG. 12 is a diagram illustrating an example of character data held by an own vehicle shape attribute holding section according to the first embodiment of the vehicle exterior moving object detection system of the present invention. FIG. 13 is a flowchart diagram illustrating processing details of a movable-component region acquiring step according to the first embodiment of the vehicle exterior moving object detection system of the present invention. FIG. 14 is a conceptual view illustrating an example of the calculation of movable-component regions according to the first embodiment of the vehicle exterior moving object detection system of the present invention. Those parts illustrated in FIGS. 11 through 14 which are denoted by reference symbols that are identical to those illustrated in FIGS. 1 through 10 are identical to the corresponding parts, and their detailed description will be omitted.

As illustrated in FIG. 11, the movable-component region setting section 103 includes an own vehicle shape attribute holding section 103A, a coordinate transforming section 103B, and a movable-component region detecting section 103C.

The own vehicle shape attribute holding section 103A holds shape information and attribute information of the components that make up the own vehicle 1 illustrated in FIG. 2, information about the movable components, and attribute information of the cameras, and sends the information thus held to the coordinate transforming section 103B. The shape information of the own vehicle 1 refers to the spatial arrangement of own vehicle 1 represented by dots, lines, and surfaces in a three-dimensional space, and may be like shape data for CAD, for example.

The attribute information of the cameras includes, for example, as front camera information, information ancillary to the camera such as the spatial installed position and direction of the front camera 301 and the angle of field and focal length of the camera. Similarly, leftward camera information about the leftward camera 302, rear camera information about the rear camera 303, and rightward camera information about the rightward camera 304 are configured.

The movable components of own vehicle 1 refer to those components belonging to the own vehicle 1 which are moved and rotated when operated by the user. The information about the movable components includes left front wheel information about the shape and layout of the left front wheel 4A(L) illustrated in FIG. 2, and information indicating how the shape and layout in the image are changed by the operation, such as steering and traveling, of the own vehicle 1. Similarly, left rear wheel information of the left rear wheel 4B(L), right front wheel information of the right front wheel 4A(R), right rear wheel information of the right rear wheel 4B(R), and vessel information of the vessel 3 are configured.

FIG. 12 is a diagram illustrating an example of character data held by the own vehicle shape attribute holding section 103A. Here, the own vehicle 1 is indicated by a set of shape information, attribute information, etc. of the components. FIG. 12 illustrates the description of left front wheel information which is information about the left front wheel 4A(L) and front camera information which is attribute information about the front camera 301.

The left front wheel information initially states, as attribute information, that an attribute (Attribute) of the left front wheel 4A(L) is a movable component. Then, the left front wheel information describes, as shape information, a shape (Shape) of the left front wheel 4A(L) as shape data for CAD. The left front wheel information also describes, as information about the movable component, a position (Pivot) about which the left front wheel 4A(L) as the movable component moves and rotates, a movable range (Range) thereof, and an angle (Angle) thereof.

The front camera information describes a position (Position) in which the front camera 301 is installed, a direction (Direction) of its center, and an angle of view (FOV) thereof.

The shape of the own vehicle 1 is thus represented by a combination of information about various components configuring the own vehicle 1. In the present embodiment, as only objects which have a possibility to be captured by the cameras are processed, information about shapes which have no possibility to be captured by the cameras, e.g., the roof, etc. of the own vehicle 1, may not be held by the own vehicle shape attribute holding section 103A.

The processing details of the movable-component region acquiring step will now be described below with reference to FIG. 13. The movable-component region acquiring step represents a detailed description of the processing details of (step S203) in the processing flowchart diagram illustrated in FIG. 5.

If the vehicle exterior moving object detection system 100 judges a movable-component region is set in (step S202) illustrated in FIG. 5, the vehicle exterior moving object detection system 100 acquires an own vehicle shape illustrated in FIG. 13 (step S2031) in order to acquire the movable-component region. Specifically, the vehicle exterior moving object detection system 100 acquires the information of the shape of the own vehicle 1 that is held by the own vehicle shape attribute holding section 103A.

The vehicle exterior moving object detection system 100 acquires camera information (step S2032). Specifically, the vehicle exterior moving object detection system 100 acquires information about cameras for capturing images. For example, if the front camera 301 captures an image, the vehicle exterior moving object detection system 100 acquires front camera information.

The vehicle exterior moving object detection system 100 performs a coordinate transformation (step S2033). Specifically, the coordinate transforming section 103B illustrated in FIG. 11 performs a coordinate transformation using the information of the shape of the own vehicle 1 and the attribute information of the cameras which have been acquired in the previous steps, thereby calculating how a three-dimensional shape is projected on a two-dimensional plane representing the images captured by the cameras. The result is similar to the images captured by the cameras as illustrated in FIG. 3, wherein part of the shape of the own vehicle 1 exists in a region on a two-dimensional plane.

The vehicle exterior moving object detection system 100 calculates movable-component regions (step S2034). Specifically, the movable-component region detecting section 103C illustrated in FIG. 11 calculates movable-component regions that exist on the two-dimensional plane that has been coordinate-transformed.

An example of the calculation process of movable-component regions will be described below with reference to FIG. 14. FIG. 14 illustrates the result of a coordinate transformation using the shape information of the own vehicle 1 and the rear camera information. On the two-dimensional plane that has been coordinate-transformed, there exist shapes representing part of the rear portion of the vehicle body 2, the left rear wheel 4B(L) and the right rear wheel 4B(R), and the vessel 3 among the shapes of the own vehicle. The movable-component region detecting section 103C calculates regions occupied by shapes which are set to be movable components as attributes, among them.

In FIG. 14, left rear wheel information H37, right rear wheel information H38, and vessel information H3 set to be movable as attribute information. For the sake of brevity, only the attributes of the left rear wheel information H37 and right rear wheel information H38 will be dealt with below. The movable-component region detecting section 103C illustrated in FIG. 11 calculates regions occupied by the left rear wheel information H37 and right rear wheel information H38 on the two-dimensional plane, from the left rear wheel information H37 and right rear wheel information H38, i.e., the movable-component regions 501 for the rear wheels 4B.

Referring back to FIG. 13, the vehicle exterior moving object detection system 100 outputs the movable-component regions (step S2035). Specifically, the vehicle exterior moving object detection system 100 outputs the movable-component regions calculated by the movable region detecting section 103C to the moving object detecting section 104 illustrated in FIG. 4. In the present embodiment, the vehicle exterior moving object detection system 100 outputs the movable-component regions 501 for the rear wheels 4B. After the processing sequence has been carried out, control goes to (step S204) in the processing flowchart diagram illustrated in FIG. 5.

According to the first embodiment of the vehicle exterior moving object detection system of the present invention which has been described above, detection of a moving object is performed in a region of a surrounding-area image, which region is exclusive of movable regions of movable structural components of the own vehicle. Therefore, detecting of a movable structural component of the own vehicle erroneously can be prevented. Further, overlooking of a detection target in the vicinity of the own vehicle to which the user should pay utmost attention in operating the own vehicle can also be prevented. The user can thus acquire only the result of the detection of a moving object that is required for a working process. As a result, the efficiency with which the overall working process is performed can be increased.

Embodiment 2

Figure 15:
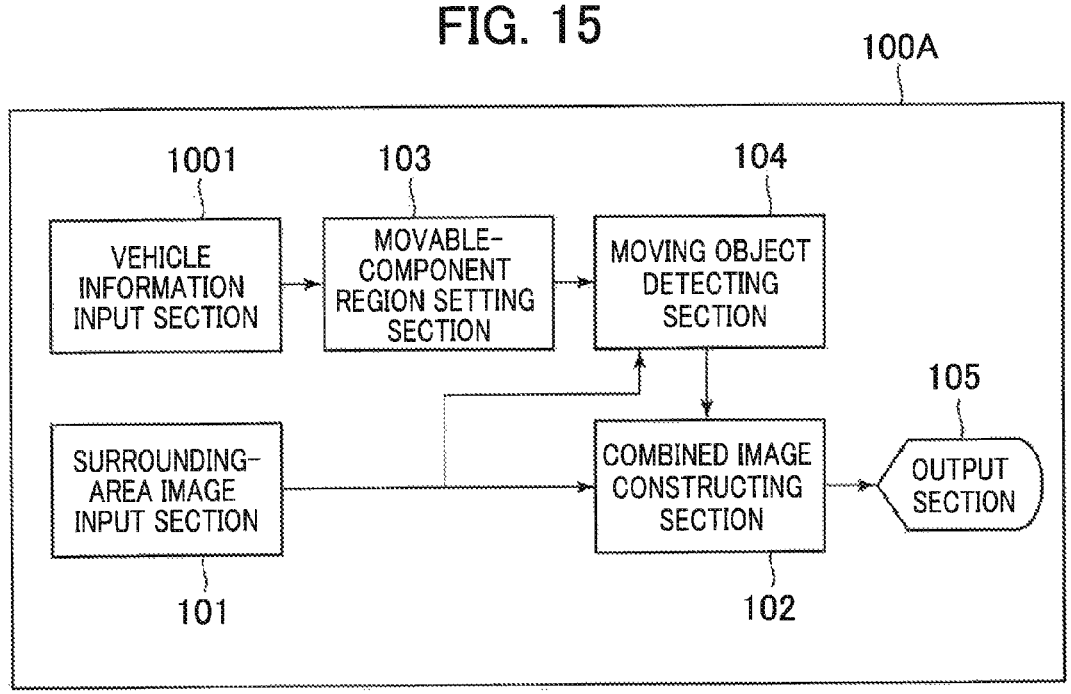
FIG. 15 is a block diagram illustrating a configuration of a second embodiment of the vehicle exterior moving object detection system of the present invention.
Figure 16:
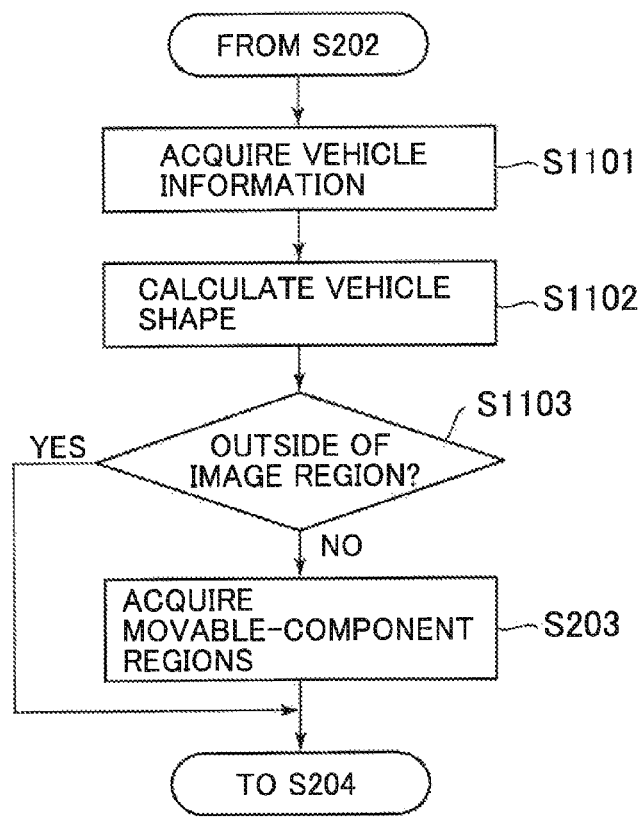
FIG. 16 is a flowchart diagram illustrating processing details of a vehicle information input section according to the second embodiment of the vehicle exterior moving object detection system of the present invention.
Figure 17:
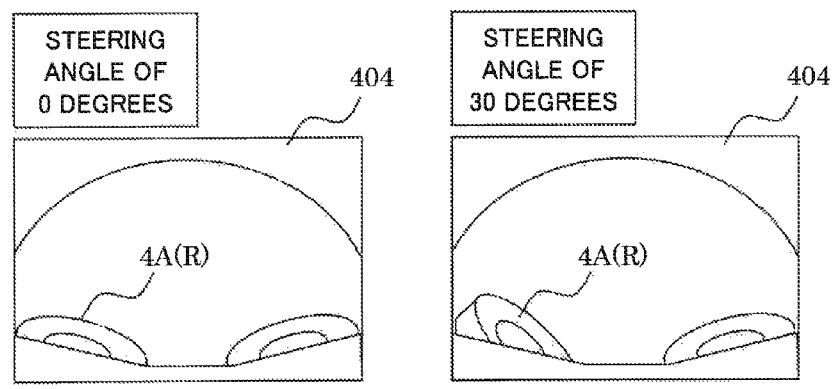
FIG. 17 is a conceptual view illustrating the relationship between steering angles and images according to the second embodiment of the vehicle exterior moving object detection system of the present invention.
Figure 18:
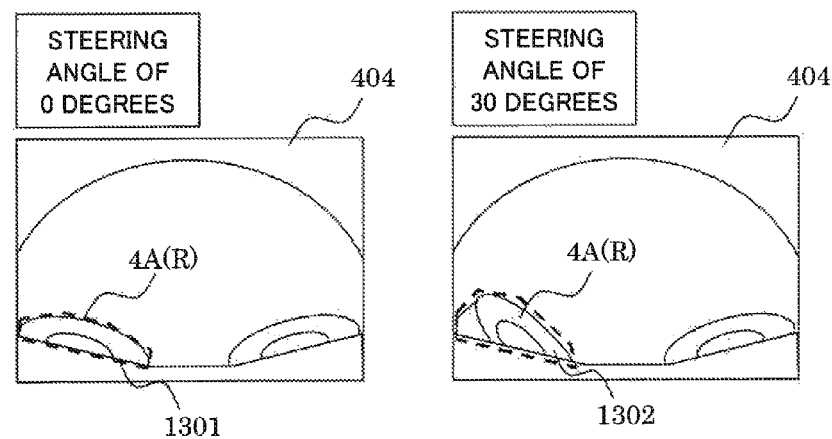
FIG. 18 is a conceptual view illustrating the relationship between steering angles and shapes of movable-component regions according to the second embodiment of the vehicle exterior moving object detection system of the present invention.

A second embodiment of the vehicle exterior moving object detection system of the present invention will be described below with reference to the drawings. FIG. 15 is a block diagram illustrating a configuration of the second embodiment of the vehicle exterior moving object detection system of the present invention. FIG. 16 is a flowchart diagram illustrating processing details of a vehicle information input section according to the second embodiment of the vehicle exterior moving object detection system of the present invention. FIG. 17 is a conceptual view illustrating the relationship between steering angles and images according to the second embodiment of the vehicle exterior moving object detection system of the present invention. FIG. 18 is a conceptual view illustrating the relationship between steering angles and shapes of movable-component regions according to the second embodiment of the vehicle exterior moving object detection system of the present invention. Those parts illustrated in FIGS. 15 through 18 which are denoted by reference symbols that are identical to those illustrated in FIGS. 1 through 14 are identical to the corresponding parts, and their detailed description will be omitted.

The vehicle exterior moving object detection system according to the present embodiment is essentially similar to the first embodiment as to its arrangement and the manner in which it operates. The second embodiment is different from the first embodiment in that it can detect a moving object in a region which is exclusive of movable-component regions even when a movable component of the own vehicle 1 moves with time, increasing or reducing the movable-component regions in the image.

Specifically, as illustrated in FIG. 15, a vehicle exterior moving object detection system 100A further includes a vehicle information input section 1001.

The vehicle information input section 1001 serves to input information about the movable components of the own vehicle 1. For example, the vehicle information input section 1001 inputs information of a steering angle of the own vehicle 1 and an amount of operation of the vessel 3 using a CAN (Control Area Network) or the like. The vehicle information input section 1001 calculates a shape of a movable component based on the input vehicle information, and, if the calculated shape is included in an image, outputs the vehicle information or the like to the movable-component region setting section 103.

The relationship between steering angles used as vehicle information and images will be described with reference to FIG. 17. FIG. 17 illustrates in its left section a rightward image 404 at an initial steering angle of 0 degrees. FIG. 17 also illustrates in its right section a rightward image 404 at a steering angle of 30 degrees after the user has turned the steering wheel to the right direction by 30 degrees. As the steering wheel turns, the right front wheel 4A(R) turns clockwise in the image, changing its apparent shape.

In the initial state illustrated in the left section, the movable-component region setting section 103 acquires the steering angle of 0 degrees from the vehicle information input section 1001. In the state illustrated in the right section after the steering wheel has turned, the movable-component region setting section 103 acquires the steering angle of 30 degrees from the vehicle information input section 1001.

Then, processing details of a movable-component region acquiring step according to the present embodiment will be described with reference to FIG. 16. The processing sequence according to the present embodiment is similar to the processing sequence illustrated in FIG. 5, but is different therefrom in that a process is added prior to (step S203). This part will be described below.

If the vehicle exterior moving object detection system 100A judges a movable-component region is set in (step S202) illustrated in FIG. 5, then the vehicle exterior moving object detection system 100A acquires vehicle information (step S1101). Specifically, the vehicle information input section 1001 inputs information about the vehicle. For example, the vehicle information input section 1001 inputs the above-described information of a steering angle.

The vehicle exterior moving object detection system 100A calculates a vehicle shape (step S1102). Specifically, the vehicle exterior moving object detection system 100A calculates a shape of a movable component of the vehicle 1 based on the input vehicle information. As described above, the layout of the right front wheel 4A(R) has been changed depending on the magnitude of the steering angle. As illustrated in FIG. 17, when the steering angle is of 30 degrees, a front portion of the right front wheel 4A(R) is so shaped as to stick out to the right side which corresponds to the outside of the vehicle body 2 compared with when steering angle is of 0 degrees. A rear portion of the right front wheel 4A(R) is so shaped as to recede into the left side which corresponds to the inside of the vehicle body 2.

Referring back to FIG. 16, the vehicle exterior moving object detection system 100 judges whether the shape in question is outside of the image region or not (step S1103). Specifically, the vehicle exterior moving object detection system 100A judges whether the shape of the movable component of the own vehicle 1 which has been calculated on the basis of the input vehicle information is included in the image being dealt with. If the shape of the movable component of the own vehicle 1 is outside of the image region, then control goes to (step S204). Otherwise, control goes to (step S203).

The movable-component region setting section 103 of the vehicle exterior moving object detection system 100A acquires the movable-component regions (step S203). Specifically, the movable-component region setting section 103 acquires the shape and layout of the shape of the own vehicle 1 in the image which has been calculated on the basis of the input vehicle information.

An example of the acquisition of the movable-component region will be described with reference to FIG. 18. FIG. 18 illustrates in its left section a rightward image 404 at a steering angle of 0 degrees, with a movable region 1301 being indicated by the broken lines in the image. FIG. 18 also illustrates in its right section a rightward image 404 at a steering angle of 30 degrees, with a movable region 1302 being indicated by the broken lines in the image.

The vehicle exterior moving object detection system 100A detects a moving object in the same manner as with the first embodiment, using these movable-component regions. Even when the own vehicle 1 changes its state, since movable-component regions commensurate with the changed state can be acquired, the movable components of the own vehicle 1 are prevented from entering the detection target region. As a result, an unwanted erroneous detection is prevented from taking place. Furthermore, because a region which is to be essentially included in a detection target region is prevented from remaining included in a movable-component region, an appropriate moving object detection can be performed. In particular, it is possible to maintain as wide a necessary detection target region as possible in the vicinity of the own vehicle 1 which is important for safety.

It has been described in the present embodiment that the CAN is used as a route for inputting vehicle information. However, the route for inputting vehicle information is not limited to the CAN. In addition, it has been described that a steering angle is used as input vehicle information. However, the input vehicle information is not limited to the steering angle. The rotational speed of a wheel of the own vehicle 1 may be input as vehicle information, so that it is possible to avoid an erroneous detection due to the rotation of the wheel in an image. Similarly, the amount of operation of the vessel 3 may be input as vehicle information, so that it is possible to avoid an erroneous detection due to the movement of the vessel 3 in an image.

According to the second embodiment of the vehicle exterior moving object detection system of the present invention which has been described above, the effects similar to those of the first embodiment which has been described above can be obtained.

According to the second embodiment of the vehicle exterior moving object detection system of the present invention, even when the own vehicle 1 changes its state, since movable-component regions commensurate with the changed state are set, it is possible to maintain as wide a necessary detection target region as possible.

Embodiment 3

Figure 19:
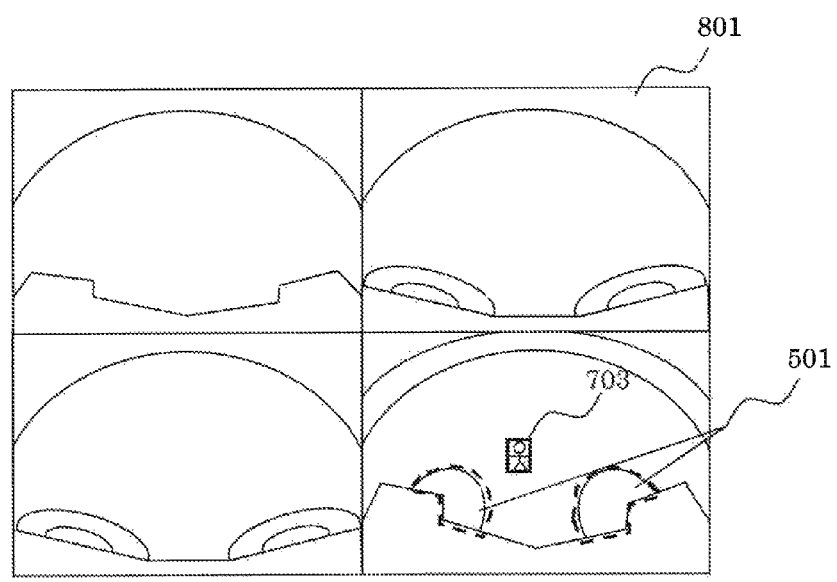
FIG. 19 is a conceptual view illustrating an example of displaying the detection result of the detection of a moving object according to a third embodiment of the vehicle exterior moving object detection system of the present invention.

A third embodiment of the vehicle exterior moving object detection system of the present invention will be described below with reference to the drawings. FIG. 19 is a conceptual view illustrating an example of displaying the detection result of the detection of a moving object according to the third embodiment of the vehicle exterior moving object detection system of the present invention. Those parts illustrated in FIG. 19 which are denoted by reference symbols that are identical to those illustrated in FIGS. 1 through 18 are identical to the corresponding parts, and their detailed description will be omitted.

The vehicle exterior moving object detection system according to the present embodiment is essentially similar to the first embodiment as to its arrangement and the manner in which it operates. The third embodiment is different from the first embodiment in that it does not output the inside of movable-component regions to the output section 105. The processing sequence according to the present embodiment is similar to the processing illustrated in FIGS. 5 and 16. However, since the processing details of (step S208) are different, this part will be described below.

When the construction of a combined image (step S208) is carried out, a tile-shaped combined image 801 illustrated in FIG. 19 is constructed. The combined image constructing section 102 of the vehicle exterior moving object detection system 100 illustrated in FIG. 4 performs a process of filling the inside of the movable-component regions 501 for the rear wheel 4B with a fixed color. In FIG. 19, the combined image constructing section 102 uniformly fills the inside of the movable-component regions 501 with white. The inside of the movable-component regions 501, which is not a detection target where a moving object is to be detected, is thus not displayed on the output section 105. As a result, unwanted moving objects are concealed from user's view, so that the user is prevented from being forced to pay unnecessary attention to unwanted moving objects.

According to the third embodiment of the vehicle exterior moving object detection system of the present invention which has been described above, the effects similar to those of the first embodiment which has been described above can be obtained.

According to the third embodiment of the vehicle exterior moving object detection system of the present invention which has been described above, unwanted moving objects can be concealed from user's view, so that the user can be prevented from being forced to pay unnecessary attention to unwanted moving objects.

Embodiment 4

Figure 20:
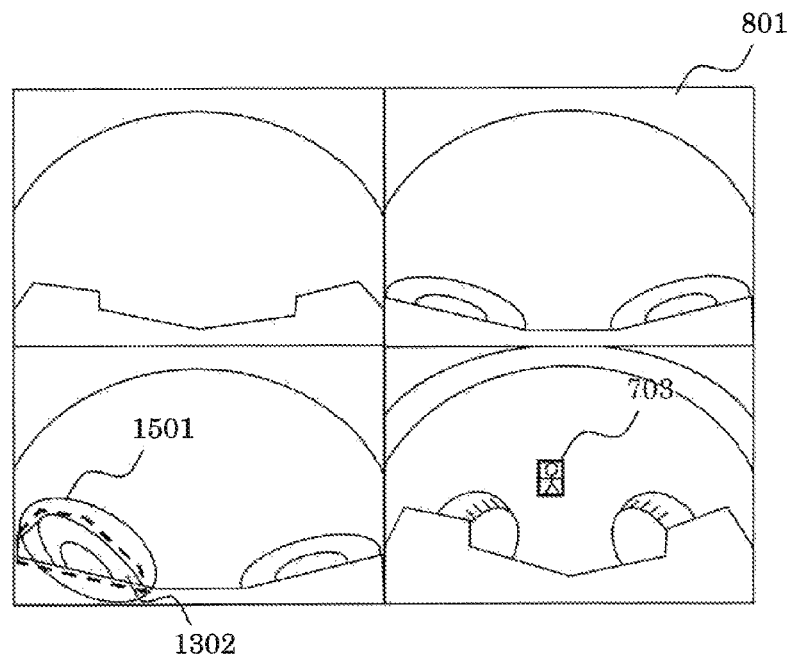
FIG. 20 is a conceptual view illustrating an example of displaying the detection result of the detection of a moving object according to a fourth embodiment of the vehicle exterior moving object detection system of the present invention.
Figure 21:
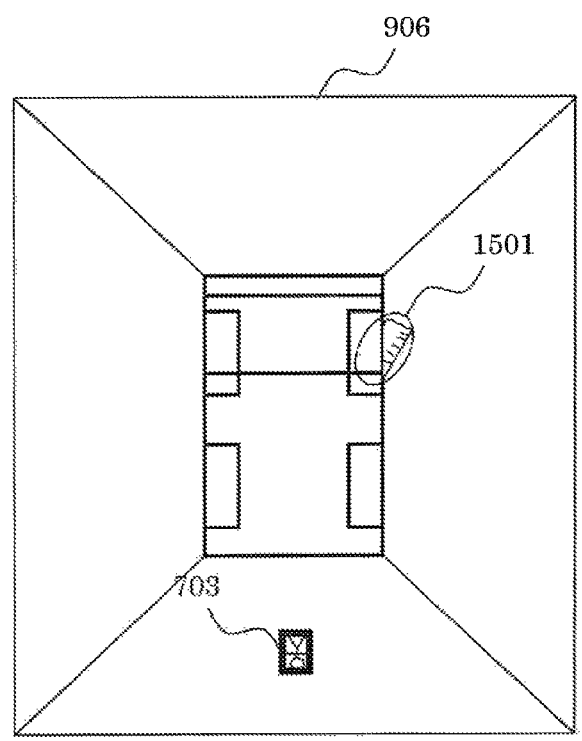
FIG. 21 is a conceptual view illustrating another example of displaying the detection result of the detection of a moving object according to the fourth embodiment of the vehicle exterior moving object detection system of the present invention.

A fourth embodiment of the vehicle exterior moving object detection system of a fourth embodiment will be described below with reference to the drawings. FIG. 20 is a conceptual view illustrating an example of displaying the detection result of the detection of a moving object according to the fourth embodiment of the vehicle exterior moving object detection system of the present invention. FIG. 21 is a conceptual view illustrating another example of displaying the detection result of the detection of a moving object according to the fourth embodiment of the vehicle exterior moving object detection system of the present invention. Those parts illustrated in FIGS. 20 and 21 which are denoted by reference symbols that are identical to those illustrated in FIGS. 1 through 19 are identical to the corresponding parts, and their detailed description will be omitted.

The vehicle exterior moving object detection system according to the present embodiment is essentially similar to the first embodiment as to its arrangement and the manner in which it operates. The fourth embodiment is different from the first embodiment in that a moving object detected in a movable-component region is displayed by a technique different from a technique for displaying a moving object detected in another region. The processing sequence according to the present embodiment is similar to the processing illustrated in FIGS. 5 and 16. However, since the processing details of (step S208) are different, this part will be described below.

When the construction of a combined image (step S208) is carried out, a tile-shaped combined image 801 illustrated in FIG. 20 is constructed. The combined image constructing section 102 of the vehicle exterior moving object detection system 100A illustrated in FIG. 15 plots a graphic pattern 1501 indicating that it is not a detection target, in surrounding relation to a movable-component region 1302 at a steering angle of 30 degrees. Here, the graphic pattern 1501 is plotted as an elliptic pattern. The elliptic pattern is plotted by a technique different from a technique for plotting a bold-line rectangular pattern for the detection result 703 in the detection target region. In this manner, an image of an object which is not a detection target but which appears to be moving is displayed in a manner different from the detection result 703 by the output section 105.

Another example in which the construction of a combined image (step S208) is carried out and a tile-shaped combined image 906 in a bird's eye view illustrated in FIG. 21 is constructed will be described. In this example, the combined image constructing section 102 of the vehicle exterior moving object detection system 100A illustrated in FIG. 15 plots a graphic pattern 1501 indicating that it is not a detection target, in surrounding relation to the right front wheel at a steering angle of 30 degrees. Here, the graphic pattern 1501 is plotted as an elliptic pattern. The elliptic pattern is plotted by a technique different from a technique for plotting a bold-line rectangular pattern for the detection result 703 in the detection target region. In this manner, an image of an object which is not a detection target but which appears to be moving is displayed in a manner different from the detection result 703 by the output section 105.

In this manner, an image of an object which is not a detection target but which appears to be moving is displayed in a manner different from a moving object as a detection result by the output section 105. As a consequence, it is possible to indicate which one of moving objects in the image displayed by the output section 105 is not a detection target. The user can be thus prevented from being forced to pay unnecessary attention to unwanted moving objects.

According to the fourth embodiment of the vehicle exterior moving object detection system of the present invention which has been described above, the effects similar to those of the first embodiment which has been described above can be obtained.

According to the fourth embodiment of the vehicle exterior moving object detection system of the present invention which has been described above, which one of moving objects in the image displayed by the output section 105 is not a detection target can be indicated, so that the user can be thus prevented from being forced to pay unnecessary attention to unwanted moving objects.

Embodiment 5

Figure 22:
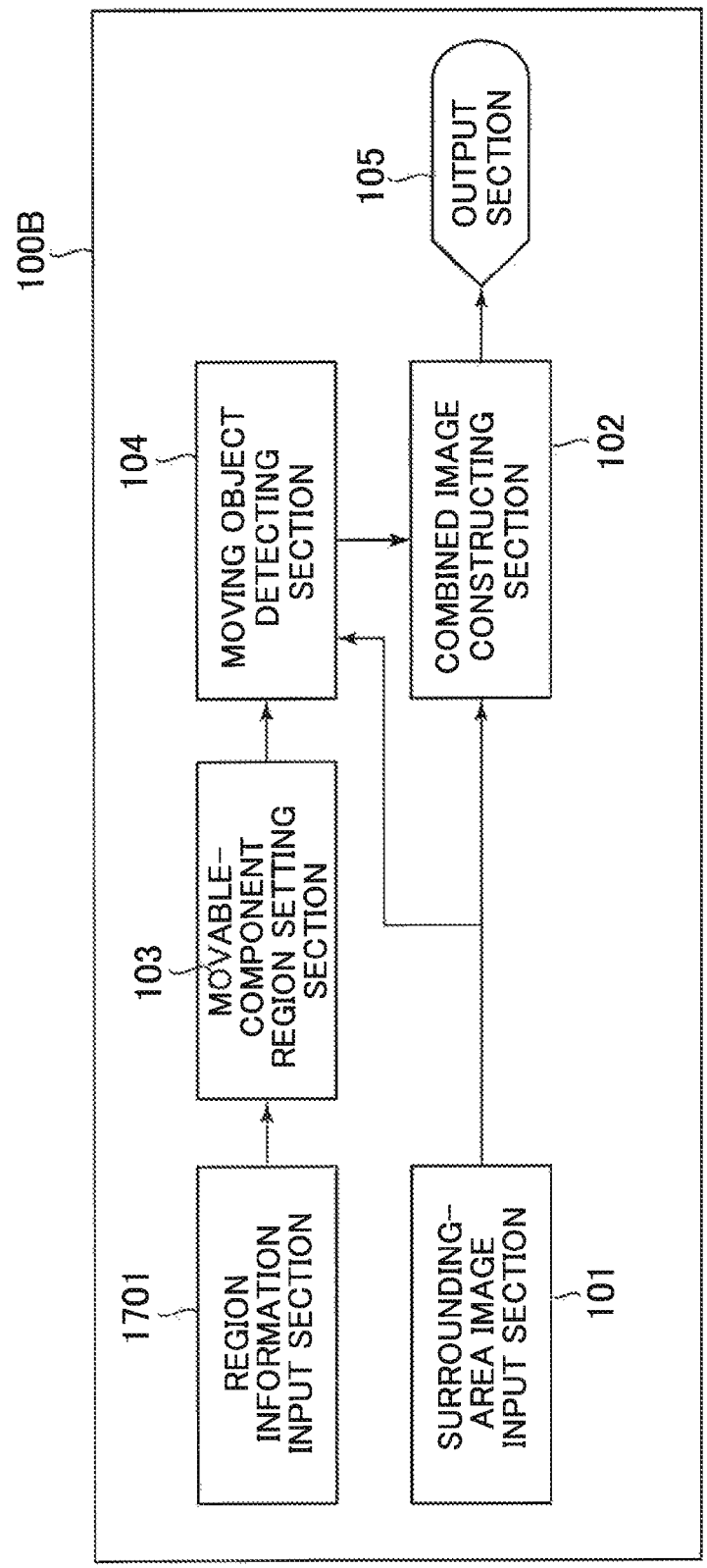
FIG. 22 is a block diagram illustrating a configuration of a fifth embodiment of the vehicle exterior moving object detection system of the present invention.
Figure 23:
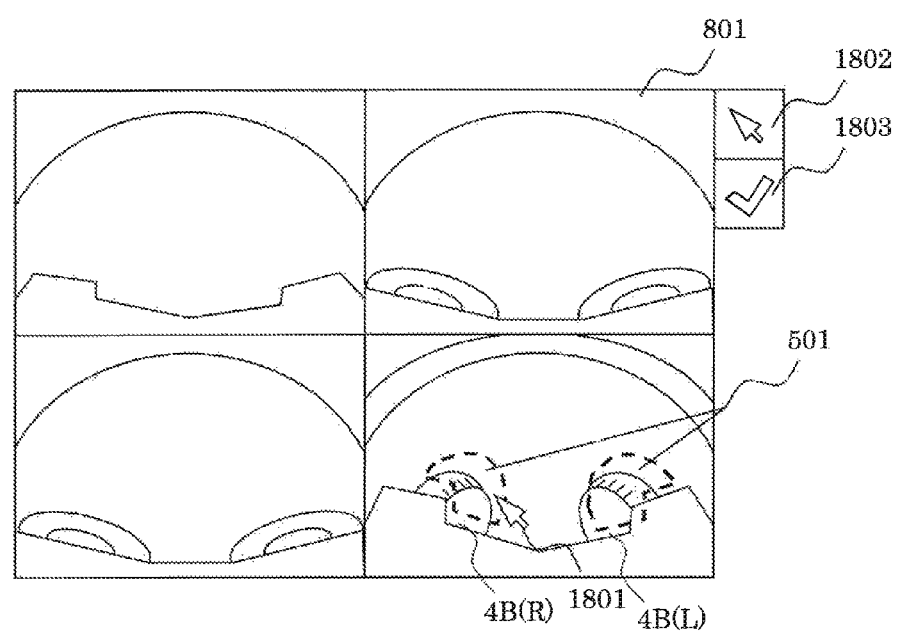
FIG. 23 is a conceptual view illustrating an example of displaying the detection result of the detection of a moving object according to the fifth embodiment of the vehicle exterior moving object detection system of the present invention.

A fifth embodiment of the vehicle exterior moving object detection system of the present invention will be described below with reference to the drawings. FIG. 22 is a block diagram illustrating a configuration of the fifth embodiment of the vehicle exterior moving object detection system of the present invention. FIG. 23 is a conceptual view illustrating an example of displaying the detection result of the detection of a moving object according to the fifth embodiment of the vehicle exterior moving object detection system of the present invention. Those parts illustrated in FIGS. 22 and 23 which are denoted by reference symbols that are identical to those illustrated in FIGS. 1 through 21 are identical to the corresponding parts, and their detailed description will be omitted.

The vehicle exterior moving object detection system according to the present embodiment is essentially similar to the first embodiment as to its arrangement and the manner in which it operates. The fifth embodiment is different from the first embodiment in that the user is allowed to change the layout of movable-component regions in an image. Specifically, as illustrated in FIG. 22, a vehicle exterior moving object detection system 100B further includes a region information input section 1701.

The region information input section 1701 includes an input device such as a mouse or a keyboard, and allows the user to change the layout of movable-component regions by designating coordinates in an image by the output section. The region information input section 1701 outputs a coordinate signal, etc. to the movable-component region setting section 103. The processing sequence according to the present embodiment is similar to the processing illustrated in FIGS. 5 and 16. However, since the processing details of acquiring movable-component regions (step S203) are different, this part will be described below.

The acquisition of movable-component regions according to the present embodiment in (step S203) will be described below with reference to FIG. 23. FIG. 23 illustrates an example of a tile-shaped combined image 801. The front camera 301, the leftward camera 302, the rear camera 303, and the rightward camera 304 which are mounted on the own vehicle 1 may not necessarily have their positions and angles in accordance with the specifications due to slight errors caused when they are installed. In such a case, there is a possibility that the movable-component regions that are set by the movable-component region setting section 103 and the regions that are actually occupied by the movable components in images may deviate from each other.

In the example illustrated in FIG. 23, a layout difference exists between movable-component regions 501 for the rear wheels 4B and the movable components of the actual rear wheels 4B existing in the image. In order to eliminate the difference, the user changes the layout of movable-component regions.

The user inputs and designates coordinates in the image displayed by the output section from the input device of the region information input section 1701. The designated coordinates are indicated by an input cursor 1801. Thereafter, the user depresses a movable-component region operation button 1802 and moves the input cursor 1801 to designate coordinates for thereby placing the movable-component regions 501 for the rear wheels 4B over the movable components of the actual rear wheels 4B.

Then, the user depresses a setting completion button 1803 to complete the layout of the movable-component regions 501 for the rear wheels 4B. The vehicle exterior moving object detection system 100B then performs the processing using the movable-component regions 501 for the rear wheels 4B in the newly set layout.

According to the present embodiment, as described above, even if the movable-component regions that are set by the movable-component region setting section 103 and the regions that are actually occupied by the movable components in images are different from each other due to errors or the like caused when the cameras are installed, appropriate movable-component regions can be set again. As a result, the process of detecting a moving object can be carried out more accurately.

According to the fifth embodiment of the vehicle exterior moving object detection system of the present invention which has been described above, the effects similar to those of the first embodiment which has been described above can be obtained.

According to the fifth embodiment of the vehicle exterior moving object detection system of the present invention which has been described above, appropriate movable-component regions can be set again even if the movable-component regions that are set and the regions that are actually occupied by the movable components in images are different from each other, so that it becomes possible to perform the process of detecting a moving object more accurately.

Embodiment 6

Figure 24:
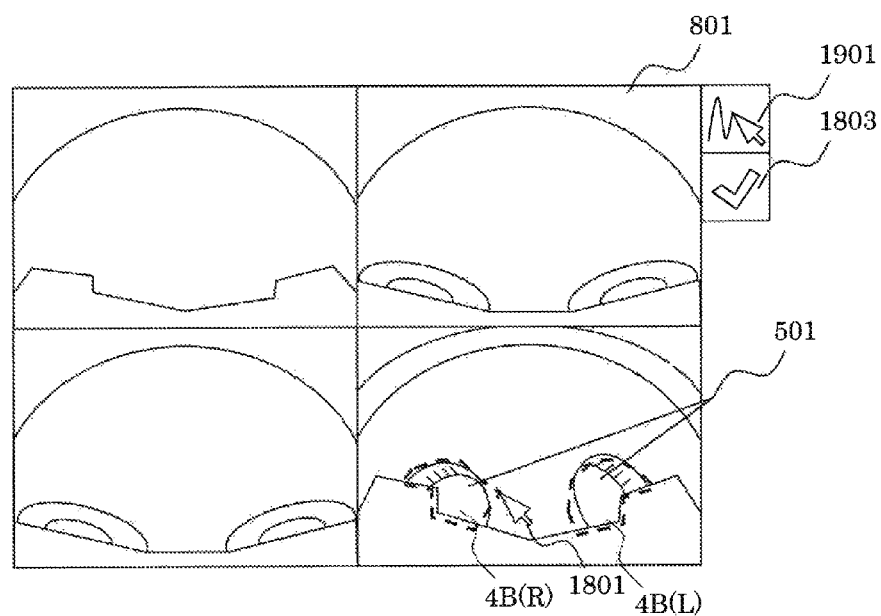
FIG. 24 is a conceptual view illustrating an example of displaying the detection result of the detection of a moving object according to a sixth embodiment of the vehicle exterior moving object detection system of the present invention.

A sixth embodiment of the vehicle exterior moving object detection system of the present invention will be described below with reference to the drawings. FIG. 24 is a conceptual view illustrating an example of displaying the detection result of the detection of a moving object according to the sixth embodiment of the vehicle exterior moving object detection system of the present invention. Those parts illustrated in FIG. 24 which are denoted by reference symbols that are identical to those illustrated in FIGS. 1 through 23 are identical to the corresponding parts, and their detailed description will be omitted.

The vehicle exterior moving object detection system according to the present embodiment is essentially similar to the fifth embodiment as to its arrangement and the manner in which it operates. The sixth embodiment is different from the fifth embodiment in that the user is allowed to plot movable-component regions in images.

According to the fifth embodiment, as described above, in the event that the front camera 301, the leftward camera 302, the rear camera 303, and the rightward camera 304 which are mounted on the own vehicle 1 do not necessarily have their positions and angles in accordance with the specifications due to slight errors caused when they are installed, there is a possibility that the movable-component regions that are set by the movable-component region setting section 103 and the regions that are actually occupied by the movable components in images may deviate from each other.

If the deviation is large, then it is assumed that the cameras have their viewpoints changed to a large extent, increasing changes in the apparent shapes of the movable components in the images. In the example illustrated in FIG. 24, there is a difference between the shapes of the movable-component regions 501 for the rear wheels 4B and the movable components of the actual rear wheels 4B existing in the images. In order to eliminate the difference, the user changes the shapes of the movable-component regions (assigns input regions as movable-component regions).

The user inputs and designates coordinates in the image displayed by the output section from the input device of the region information input section 1701. The designated coordinates are indicated by the input cursor 1801. Thereafter, the user depresses a movable-component region plotting button 1901 and moves the input cursor 1801 to plot shapes of movable-component regions for thereby placing the movable-component regions 501 for the rear wheels 4B over the movable components of the actual rear wheels 4B.

Then, the user depresses the setting completion button 1803 to complete the change in the shapes of the movable-component regions 501 for the rear wheels 4B. The vehicle exterior moving object detection system 100B then performs the processing using the movable-component regions 501 for the rear wheels 4B that have been newly changed in shape.

According to the present embodiment, as described above, even if the movable-component regions that are set by the movable-component region setting section 103 and the regions that are actually occupied by the movable components in images are different from each other due to errors caused when the cameras are installed, appropriate movable-component regions can be set again. As a result, the process of detecting a moving object can be carried out more accurately.

According to the sixth embodiment of the vehicle exterior moving object detection system of the present invention which has been described above, the effects similar to those of the first embodiment and the fifth embodiment which have been described above can be obtained.

According to the sixth embodiment of the vehicle exterior moving object detection system of the present invention which has been described above, appropriate movable-component regions can be set again even if the movable-component regions that are set and the regions that are actually occupied by the movable components in images are different from each other, so that it becomes possible to perform the process of detecting a moving object more accurately.

The embodiments of the present invention have been illustrated as being applied to a large-size dump truck as a construction machine. However, the present invention is not limited to such an application. The present invention is also applicable to large-size machines at construction sites and large-size work machines at disaster sites.

The present invention is not limited to the above embodiments, but covers various changes and modifications. For example, the above embodiments have been described in detail for an easier understanding of the present invention, and should not necessarily be limited to those which have all the elements described. The above elements, functions, processing sections, processing means, etc. may be partly or wholly hardware-implemented by being designed as integral circuits, for example. The above elements, functions, etc. may also be software-implemented by a processor which interprets and executes programs for realizing the functions.

DESCRIPTION OF REFERENCE SYMBOLS

1: Dump truck (own vehicle)
2: Vehicle body
3: Vessel (cargo bed)
4A: Front wheel
4B: Rear wheel
8: Operator cab
100: Vehicle exterior moving object detection system
101: Surrounding-area image input section
102: Combined image constructing section
103: Movable region setting section
104: Moving object detecting section
105: Output section
301: Front camera
302: Leftward camera
303: Rear camera
304: Rightward camera
401: Front image
402: Leftward image
403: Rear image
404: Rightward image
1001: Vehicle information input section
1701: Region information input section
1801: Input cursor

The invention claimed is:
1. A vehicle exterior moving object detection system comprising: a surrounding-area image input section for capturing images in areas surrounding its own vehicle and delivering the captured images as surrounding-area images;

a combined image constructing section for constructing a combined image including a result output from detection of a moving object by combining the surrounding-area images; and an output section for presenting the combined image to a user; wherein the vehicle exterior moving object detection system further comprises: a movable-component region setting section for setting shapes and layout of movable components of the own vehicle in the surrounding-area images and calculating regions for the movable components of the own vehicle; and a moving object detecting section for being supplied with the movable-component regions calculated by the movable-component region setting section and the surrounding-area images from the surrounding-area image input section, performing a process of detecting a moving object on a region in the surrounding-area images which is exclusive of the movable-component regions, and outputting a detection result.

2. The vehicle exterior moving object detection system according to claim 1, further comprising:

a vehicle information input section for acquiring and delivering information of the own vehicle;

wherein the movable-component region setting section calculates the shapes and layout of the movable components in the surrounding-area images on the basis of the information of the own vehicle from the vehicle information input section.

3. The vehicle exterior moving object detection system according to claim 2, wherein the combined image constructing section displays the movable-component regions in the surrounding-area images by a plotting technique different from that for displaying of the detection result of the moving object.

4. The vehicle exterior moving object detection system according to claim 1, further comprising:

a coordinate input section capable of inputting coordinates in images displayed by the output section;

wherein the movable-component region setting section moves the movable-component regions to positions represented by coordinates input by the coordinate input section in the surrounding-area images.

5. The vehicle exterior moving object detection system according to claim 1, further comprising:

a region input section capable of inputting regions in images displayed by the output section;

wherein the movable-component region setting section assigns regions input in the surrounding-area images by the region input section as the movable-component regions.

* * * * *